July 23, 1968   J. L. HUITT ET AL   3,393,741
METHOD OF FRACTURING SUBSURFACE FORMATIONS
Filed May 27, 1966
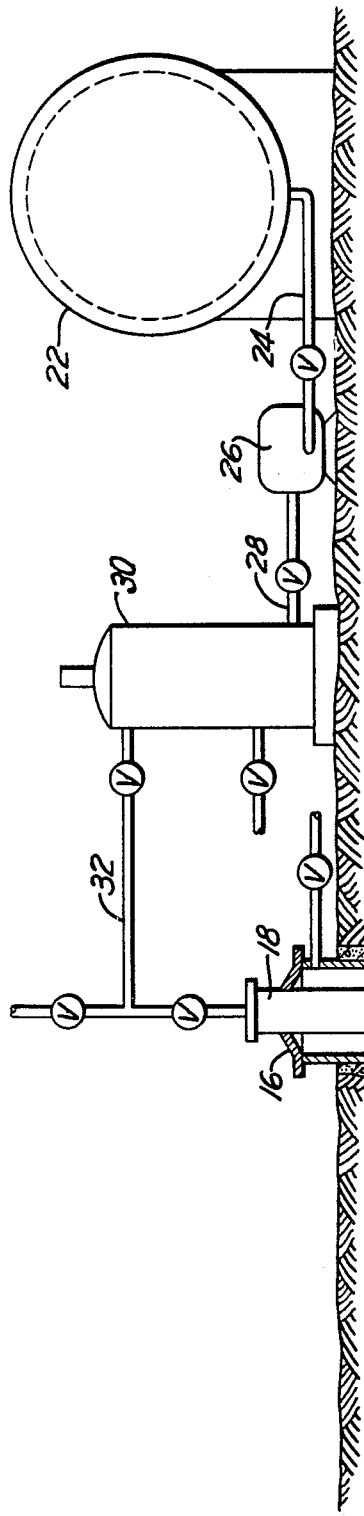
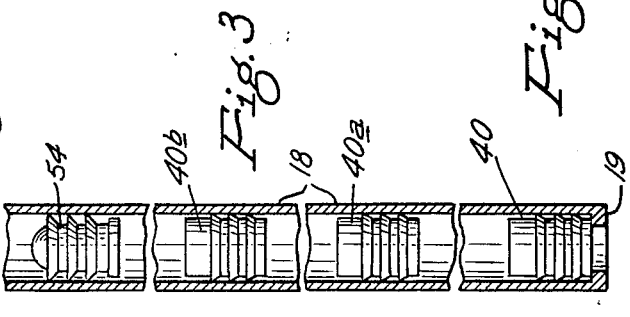
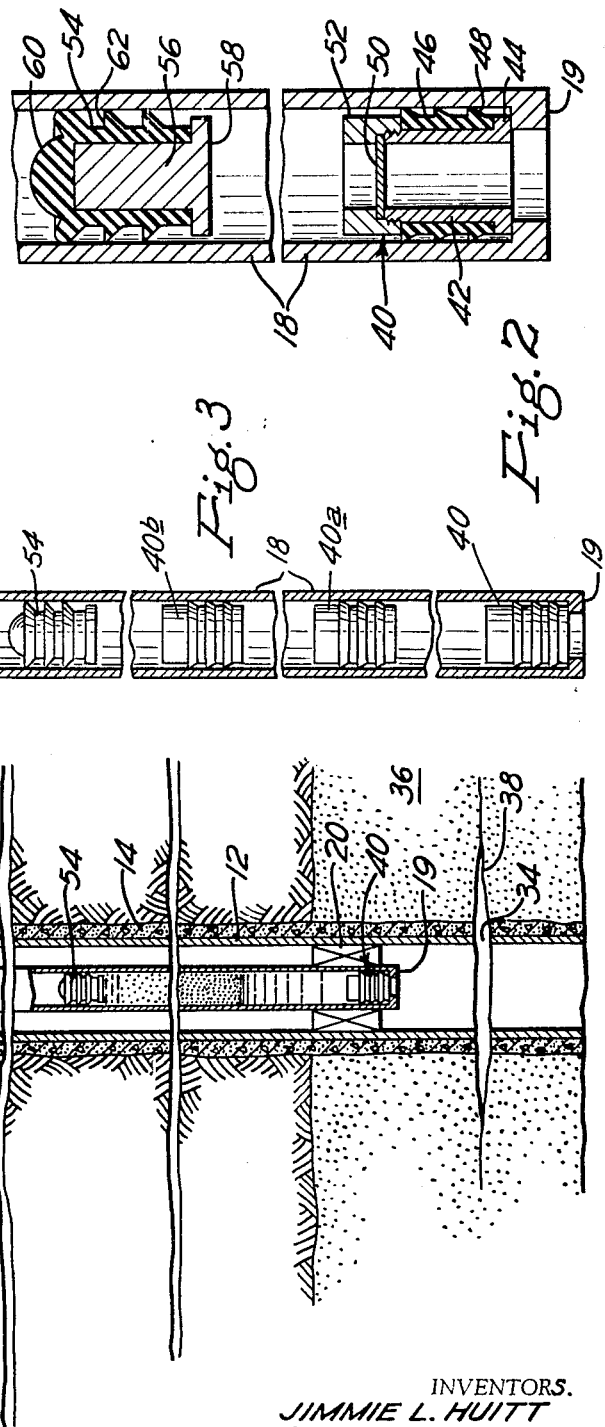
INVENTORS.
JIMMIE L. HUITT
BRUCE B. McGLOTHLIN United States Patent Office 3,393,741
Patented July 23, 1968

3,393,741
METHOD OF FRACTURING SUBSURFACE FORMATIONS
Jimmie L. Huitt, Glenshaw, and Bruce B. McGlothlin, O'Hara Township, Allegheny County, Pa., assignors to Gulf Research & Development Company, Pittsburgh, Pa., a corporation of Delaware
Filed May 27, 1966, Ser. No. 553,543
12 Claims. (Cl. 166—42)

ABSTRACT OF THE DISCLOSURE

A method of fracturing subsurface formations penetrated by a well in which a liquid having a propping agent suspended in it is held in the well until the pressure on the liquid has been built high enough by a compressed gas to rupture a blowout disc. The compressed gas then forces the liquid from the well into the fracture.

---

This invention relates to a method of stimulating production of fluids from wells, and more particularly to a method of fracturing subsurface formations penetrated by wells.

Frequently, subsurface formations contain a substantial amount of fluids, but the high resistance to flow of fluids from the formation into wells penetrating the formation precludes high production rates from the wells. The high resistance to flow may be caused by an initial low permeability of the formation. Damage to the formation immediately adjacent the well during the drilling of the well may reduce the formation's permeability far below its initial permeability. Because the radial flow pattern of formation fluids into a well forces all of the fluids produced by the well to go through a restricted area, a high-flow capacity immediately adjacent the well is of primary importance.

One of the most successful methods of stimulating production from wells is hydraulic fracturing. In the hydraulic fracturing process, a liquid is pumped down the well and the pressure on the liquid increased until the formation penetrated by the well breaks down to initiate a fracture. After initiation of the fracture, a liquid having particles of a propping agent is displaced into the fracture to hold the fracture open after pressure on the fracturing liquid is released and the well is placed on production.

Hydraulic fracturing is usually an expensive well servicing operation. An average cost of a fracturing job is about $7,000. One principal cost in hydraulic fracturing is the rental of the high-pressure pumps used to pump the fracturing liquid down the well and into the fracture. Although ordinarily the pumps are used only for a short time, the pumps must be capable of pumping liquid at a high rate, as well as pumping the liquid at a high pressure, to extend the fracture from the well. Moreover, the pumps must be capable of pumping a liquid having a propping agent suspended in it. Because of the high cost of fracturing, many wells capable of being stimulated to higher production rates are not fractured because the increased production is not sufficient to warrant the cost of fracturing.

This invention resides in a process in which a fracture is initiated from a well at the desired depth of the fracture. A carrying liquid having a propping agent suspended therein is held in the well above a blowout disc set in the well to prevent flow of the carrying liquid into the fracture. A plug adapted to prevent flow of gas past it is inserted in the well after the carrying liquid and is followed by a compressed gas. The pressure on the gas is increased to rupture the blowout disc and force the liquid and suspended propping agent into the fracture. The plug between the carrying liquid and the compressed gas is retained in the well to prevent discharge of the compressed gas from the well into the fracture.

In the drawings:

FIGURE 1 is a diagrammatic view of apparatus for fracturing a subsurface formation by this invention after initiation of the fracture but before displacement of the carrying liquid and propping agent into the fracture.

FIGURE 2 is a vertical sectional view of a blowout disc and wiper plug useful in the process of this invention.

FIGURE 3 is a diagrammatic view partially in vertical section of an embodiment of the invention employing a plurality of blowout plugs.

Referring to the drawings, a well indicated generally by reference numeral 10 is illustrated with casing 12 extending downwardly to the total depth of the well. Casing 12 is cemented in the well by conventional procedures whereby the well is surrounded by a sheath of cement 14. The upper end of the casing 12 is closed by cap 16 through which tubing 18 extends.

Tubing 18, which extends down the well to a depth slightly above the depth of the desired fracture, has an inwardly extending shoulder 19 at its lower end to retain plugs in the tubing in the manner hereinafter described. Tubing 18 is run into the well with a packer 20 which is set in the casing at the desired depth. Because of the high pressure exerted below the lower end of packer 20, a hydraulic hold-down, not shown, of conventional construction may be required to hold the tubing 18 and packer 20 in place.

FIGURE 1 illustrates the preferred embodiment of this invention in which the compressed gas is supplied by vaporizing a liquefied gas such as liquefied nitrogen, carbon dioxide, or methane. Compressed air can be used when the fracturing process is used on a water well. Gas at pressures as high as about 10,000 p.s.i is required in this fracturing process, and can be obtained from any source such as high pressure compressors capable of supplying gas at the required pressure. Liquefied nitrogen is available in the oil fields for well treating procedures with pumps capable of delivering nitrogen at pressures as high as 10,000 p.s.i. For convenience, this invention will be described for a fracturing process using liquefied nitrogen with equipment to supply gaseous nitrogen at the required pressure.

Above the surface of the ground is a storage tank 22 for the liquefied nitrogen. Storage tank 22 is a large insulated vacuum-type vessel capable of holding liquefied nitrogen at a temperature of approximately −320° F. An outlet line 24 from the storage tank 22 delivers liquefied gas to a pump 26 which increases the pressure on the liquefied gas to the level required for the fracturing operation. The liquefied gas at high pressure passes through line 28 to a vaporizer 30. Gas from vaporizer 30 is delivered through a line 32 to the upper end of the tubing 18. The storage tank 22, pump 26, and vaporizer 30 are available in the oil fields mounted on a single truck to provide nitrogen for use in wells.

The casing 12 is perforated or notched at 34 to provide access into a fluid-bearing subsurface formation 36 penetrated by the well 10. Any of the conventional techniques for cutting through casing, such as shaped charges, mechanical cutters, or abrasive slurries can be used to cut the opening 34. After the opening 34 has been cut in the casing, a fracturing liquid is pumped down the well. The fracturing liquid can be any liquid conventionally used in fracturing operations that permits an increase in pressure adequate to break down the formation to initiate the fracture. The particular fracturing liquid used will depend in part on the permeability of the formation to be fractured. Water can be used to initiate the fracture in formations of low permeability. A preferred fracturing liquid is a low-penetrating liquid such as a highly viscous liquid or gel which because of its viscosity offers high resistance to flow through permeable formations. Gelled oils such as diesel oil or crude oil containing soap are effective fracturing liquids. Another suitable fracturing liquid is a liquid to which finely divided solid material, for example, silica flour, has been added. The finely divided solid material filters from the liquid to seal the exposed formation and prevent flow of liquid into the formation. Water to which a gelling material such as guar gum has been added is a preferred low-penetrating liquid having both properties of high viscosity and sealing the face of a permeable formation.

After pumping the fracturing liquid into the tubing, the pressure on the liquid is increased until formation 36 breaks down to initiate a fracture 38. A small capacity, high-pressure pump can be used to initiate the fracture. Because equipment for injecting compressed gas into the well is available at the well site for use later in the fracturing process, it is preferred to use the liquefied nitrogen pump 26 and vaporizer 30 to supply the pressure to initiate the fracture. When the breakdown occurs, as indicated by the formation taking the fracturing liquid, pumping of the nitrogen into the well is stopped and the pressure on the well is relieved. It is preferred to inject a small amount, such as one barrel, of a gelled liquid into the well after release of the pressure to fill the well between the lower end of the tubing and the fracture 38.

The small volume of gelled liquid is followed by a blowout plug 40. Referring to FIGURE 2 in which blowout plug 40 is shown in cross section, the blowout plug consists of a hollow mandrel 42 having an outwardly extending flange 44 at its lower end. A sealing element 46 consisting of a sleeve of deformable material, such as neoprene, having a plurality of upwardly concave rings 48 extending from its outer surface is mounted on the outer surface of the mandrel. A blowout disc 50 is held in place on the upper end of the mandrel 42 by a cap 52 which is screwed onto the upper end of the mandrel and bears against the upper end of the sealing element 46 to hold it in place. Cap 52 has a central opening which allows pressure on the fluids above the blowout plug to be exerted against the blowout disc 50. The blowout plug makes a liquid-tight seal against the casing to prevent downward flow of fluid in the well until the pressure above the plug is high enough to rupture the blowout disc.

The blowout plug 40 is followed into the tubing by a spearhead of propping-agent-free, low-penetrating liquid which may be the same liquid used in the initiation of the fracture. The purpose of the spearhead is to open the fracture wide to allow entrance of propping agent and extend the fracture from the well for the desired distance into the surrounding formation. In the preferred form of the invention, the spearhead is a low-fluid loss liquid adapted to seal the faces of the fracture. The spearhead should be high in gel strength or viscosity to prevent settling of the propping agent. A minimum gel strength of ½ pound per square foot as determined on the Fann viscometer or a minimum plastic viscosity of 25 centipoises will be suitable for most propping agents to cause a propping-agent fall rate less than one foot per minute. The volume of the spearhead is the volume calculated to leak off through the faces of the fracture as the spearhead is displaced into the fracture to extend the fracture and create the desired fracture area. A spearhead volume of 2–5 barrels is used in a typical fracturing operation using this invention.

The spearhead is followed by a carrying liquid having a propping agent suspended in it. The carrying liquid should have a gel strength and viscosity such that the propping agent falls at a rate less than one foot per minute through the carrying liquid. The amount of carrying liquid will depend on the desired size of the fracture. A volume of 2 to 10 barrels is ordinarily used. Larger volumes can be used when the volume of the well is large.

An important object of this invention is to provide a fracture of very high flow capacity immediately adjacent the well. A spearhead and carrying liquid of higher viscosity than is used in conventional fracturing is used in this invention to open the fracture wide enough to receive large propping agents, and thereby provide a fracture of the desired high flow capacity. Water thickened with a suitable gelling agent such as WG–5, a guar gum fracturing liquid additive sold by Halliburton Company, in a concentration of 2 percent is a suitable carrying liquid. Carrying liquids used in conventional fracturing processes ordinarily contain less than one-half as much thickening agent as is preferably used in this invention. Crude or refined oils containing a soap to give the oil a viscosity corresponding to a propping-agent fall rate less than one foot per minute also can be used.

The propping agent suspended in the carrying liquid can be any of the several types of propping agents used in conventional hydraulic fracturing methods. Typical such propping agents are sand, nut shell particles, glass beads, and aluminum pellets in sizes ranging from 8 to 40 mesh in the U.S. Sieve Series. An important advantage of this process is that the propping agent does not pass through high pressure pumps; hence, larger propping agents can be used. The maximum propping agent size is limited by the width the fracture can be opened to allow entry of the propping agent at the injection conditions used. Preferred propping agents are hard glass beads of the type described in U.S. Patent No. 3,175,616 having a size in the range of 4 to 8 mesh in the U.S. Sieve Series. Larger particles, up to about 0.5 inch in diameter, can be used. The propping agent can be suspended in the carrying liquid at any desired concentration such as 0.1 to 5.0 lbs./gal.

The carrying liquid is followed by a small volume, preferably approximately the volume in the casing between the lower end of the tubing and the fracture 38, of propping-agent-free liquid, and that small volume of liquid is followed by a wiper plug 54. A suitable wiper plug illustrated in FIGURE 2 has a metallic central core 56 with a flange 58 on its lower end. The diameter of flange 58 is slightly smaller than the internal diameter of the tubing 18 to permit the wiper plug to pass readily through the joints of the tubing. Mounted on the core 56 is a sealing member 60 having a plurality of upwardly opening rings 62. Sealing member 60 is constructed of a deformable material such as neoprene. The rings 62 have a diameter slightly, about ⅛ inch, larger than the internal diameter of the tubing to bend the rings upwardly and thereby improve the wall-wiping and sealing action of the plug.

After the wiper plug 54 has been inserted in the upper end of tubing 18, the pipe 32 is connected to the upper end of the tubing 18 and nitrogen is pumped into the tubing above the wiper plug. The pressure on the nitrogen is increased, and the pressure transmitted to the liquid above the blowout disc, until the blowout disc is ruptured. The nitrogen expands rapidly to displace the spearhead and carrying liquid into the fracture at a high rate whereby the fracture 38 is opened widely to permit entrance of large-size particles of propping agent. If the spearhead contains a material adapted to seal the faces of the fracture to reduce leak off of fracturing liquid, displacemnt of the propping agent to the outer reaches of the fracture is facilitated.

During the expansion of the nitrogen after the blowout disc is ruptured, pump 26 continues to run and displace nitrogen into the upper end of the tubing 18. The plug 54 is forced downwardly through the tubing 18 by the expanding compressed gas until the wiper plug engages the upper end of the blowout plug 40. Further expansion of the nitrogen and the flow of the nitrogen from the lower end of the tubing is prevented by the wiper plug 54. The pump 26 is stopped and the well is shut in for a period, such as 8 to 24 hours, during which the formation 36 closes on the propping agent in the fracture 38. The nitrogen is bled from the tubing and the plugs are removed from the tubing. Thereafter, the well is completed for production of formation fluids through the fracture.

The hydraulic fracturing method of this invention has been described for a well having tubing extending downwardly within casing to the vicinity of the desired fracture. This invention can be performed in wells that do not have tubing if the casing is able to withstand the pressure that will be required to initiate the fracture and displace the carrying liquid into the fracture at the high rate of flow. If tubing is not used during the fracturing process, a suitable collar on the inner surface of the casing will be required to retain the plugs for the flow control that is essential to this invention. When the fracturing process of this invention is performed in wells not having tubing, the plugs can be fished from the well after completion of the fracturing operation and the well completed as desired for production. Similarly, fractures can be made in an open hole below the lower end of casing.

The blowout disc 50 should have strength adequate to allow the pressure on the gas above the wiper plug to increase to a pressure high enough to displace the spearhead and carrying liquid into the fracture at a high initial rate such as 10 barrels per minute and preferably 25 barrels per minute or more. A pressure above the plug at least about 2,000 p.s.i. higher than the formation pressure is ordinarily adequate. A pressure above the plug at least 3,000 p.s.i. higher than the formation pressure is preferred. The pressure of the compressed gas before the blowout disc ruptures should be high enough that the pressure in the tubing when the wiper plug strikes the blowout plug is at least 0.6 p.s.i./foot of depth to insure continued flow of liquid into the fracture at a rate high enough to transport the propping agent into the fracture. Thus, $P_1$, the pressure at which the disc breaks should be at least the pressure indicated by the equation $$P_1 = \frac{0.6 P_2 V_2 Z_2}{V_1 Z_1}$$

where $P_2$ = depth of fracture in feet,
$V_2$ = volume of gas above the wiper plug when wiper plug rests on blowout plug,
$V_1$ = volume of gas above wiper plug at time of rupture,
$Z_1$ = compressibility factor of gas under conditions existing at time of rupture,
$Z_2$ = compressibility factor of gas existing at contact of wiper plug with blowout plug.

In some instances, it may be desirable to increase the pressure differential available during the transporting of the carrying liquid into the fracture. This can be obtained by separating the carrying liquid into a series of slugs with a series of spaced blowout plugs. Each blowout plug has a blowout disc or other blowout means, such as caps held in place by shear pins, adapted to rupture at a pressure differential higher than that at which the frangible member in the next blowout plug ruptures. Referring to FIGURE 3, the tubing 18 is shown with a blowout plug 40 resting on the shoulder 19. Above the blowout plug 40 and separated therefrom by carrying liquid is a second blowout plug 40a identical to blowout plug 40 but having a blowout disc, not shown in FIGURE 3, adapted to rupture at a pressure higher than the pressure at which the disc and blowout plug 40 ruptures. A third blowout plug 40b is positioned in the tubing between blowout plug 40a and the wiper plug 54. Blowout plug 40b has a disc adapted to rupture at a pressure higher than the pressure at which the disc in blowout plug 40a ruptures. The spaces within tubing 18 between discs 40a and 40b and 40b and wiper plug 54 are filled with carrying liquid. In this embodiment of the invention, the nitrogen pump continues to run during the fracturing operation. After rupture of the disc in the lowest blowout plug 40, the expansion of the gas forces the next lowest blowout plug 40a down the tubing until it rests on the lowest blowout plug to stop flow from the tubing. The pressure on the compressed gas increases until the second blowout disc ruptures and then the next slug of carrying liquid is forced from the tubing. The sequence can be repeated as many times as desired.

The arrangement of a succession of blowout plugs can be used when because of high permeability of the formation or limited volumetric capacity of the fracturing liquid leaks into the formation occur at a rate such that a pressure high enough to break down the formation cannot be developed in the well. The fracturing liquid can be followed by a blowout plug which in turn is followed by the compressed gas. The plug allows the pressure on the gas to be increased to a level at which the formation will break down when the blowout disc in the plug ruptures. Then the series of steps described above can be used with a second blowout plug inserted ahead of the carrying liquid and a wiper plug separating the carrying liquid from compressed gas used to drive the carrying liquid into the fracture.

The fracturing method of this invention permits the creation of fractures of very high capacity in the immediate vicinity of the well bore. The placement of the spearhead and carrying liquid in the lower end of the tubing directly above the blowout disc reduces the distance which those liquids have to travel into the fracture and thereby reduces the pressure drop on the liquids. It is consequently possible to apply a very high pressure to the formation to open the fracture wide for the entrance of large-size propping agents. Because the propping agent does not pass through pumps, large-size propping agent in the range of 4 to 6 mesh and up to particles approximately ½ inch in diameter can be used.

In processes for the creation of fractures of high-flow capacity, it is imperative that the placement of the propping agent be carefully controlled. In the novel method of this invention, the wiper plug prevents flow of the compressed gas out of the tubing into the fracture; hence, only carefully controlled volumes of liquid are displaced into the fracture to deposit the propping agent, and there is no uncontrolled blowing through of gas to alter the placement of the propping agent.

We claim:

1. A method of treating an underground formation penetrated by a well to increase the rate of flow of formation fluids into the well comprising initiating a fracture from the well into the underground formation, holding a carrying liquid having propping agent suspended therein in the well, injecting a gas into the well above the carrying liquid, increasing the pressure on the gas within the well to impart a pressure on the carrying liquid nearest the fracture at least about 2,000 p.s.i. higher than the formation pressure while holding the carrying liquid in the well, releasing the carrying liquid to flow into the fracture, and blocking flow of compressed gas from the well into the fracture.

2. A method of creating a fracture of high flow capacity in a subsurface formation penetrated by a well comprising initiating a fracture extending from the well in the subsurface formation, holding a carrying liquid having a propping agent suspended therein in the well above a blowout disc to prevent flow of carrying liquid into the fracture, inserting a plug adapted to prevent flow of gas thereby into the well above the carrying liquid, injecting gas into the well above the plug, and increasing the pressure on the gas to rupture the blowout disc and force the liquid and suspended propping agent into the fracture, said plug preventing flow of compressed gas from the well into the fracture.

3. A method of fracturing a subsurface formation penetrated by a well to increase flow of formation fluids into the well, said well having tubing extending down the well to substantially the level of the desired fracture comprising initiating a fracture from the well into the formation, installing a blowout plug blocking flow from the lower end of the tubing, introducing into the tubing above the blowout plug a carrying liquid having propping agent suspended therein, inserting a wiper plug into the tubing above the carrying liquid, injecting gas into the tubing above the wiper plug, and increasing the pressure on the gas to rupture the blowout plug and displace the carrying liquid from the tubing into the fracture, said wiper plug being adapted to remain in the tubing and prevent flow of gas from the tubing.

4. A method as set forth in claim 3 in which the fracture is initiated by applying pressure by means of a compressed gas to a liquid in the well to break down the formation.

5. A method as set forth in claim 3 in which the carrying liquid has a viscosity and gel strength such that the rate of fall of propping agent in the carrying liquid is less than one foot per minute.

6. A method as set forth in claim 3 in which the pressure at which the blowout plug ruptures is at least 2,000 p.s.i. higher than the pressure in the fractured formation.

7. A method as set forth in claim 3 in which the pressure at which the blowout plug ruptures is at least the pressure indicated by the equation $$P_1 = \frac{0.6 P_2 V_2 Z_2}{V_1 Z_1}$$

where $P_2$ = depth of fracture in feet,
$V_2$ = volume of gas above the wiper plug when wiper plug rests on blowout plug,
$V_1$ = volume of gas above wiper plug at time of rupture,
$Z_1$ = compressibility factor of gas under conditions existing at time of rupture,
$Z_2$ = compressibility factor of gas existing at contact of wiper plug with blowout plug.

8. A method as set forth in claim 3 in which the carrying liquid is divided in the tubing by a series of spaced blowout plugs, each of the blowout plugs being adapted to rupture at a pressure higher than the blowout plugs lower in the tubing.

9. A method as set forth in claim 3 in which a spearhead of a liquid devoid of propping agent and having a viscosity and gel strength such that the fall of propping agent through the spearhead is less than one foot per minute is inserted into the well between the blowout plug and the carrying liquid.

10. A method as set forth in claim 9 in which the volume of the spearhead is 2 to 5 barrels and the volume of the carrying liquid is 2 to 10 barrels.

11. A method of fracturing a subsurface formation penetrated by a well, said formation being exposed to pressure within the well comprising increasing the pressure within the well to break down the subsurface formation and initiate a fracture therein, running tubing with a packer into the well to a depth slightly above the fracture, filling the well below the lower end of the tubing with a low fluid loss liquid, installing a blowout plug in the lower end of the tubing, inserting a spearhead of a liquid devoid of propping agent in the tubing above the blowout plug, injecting a carrying liquid having propping agent suspended therein into the tubing above the spearhead, inserting a wiper plug adapted to prevent flow of gas between said wiper plug and the walls of tubing into the tubing above the carrying liquid, injecting a gas into the tubing above the wiper plug, and increasing the pressure on the gas to rupture the blowout plug and displace the spearhead and carrying liquid into the fracture, said wiper plug remaining in the tubing and preventing flow of gas from the tubing.

12. A method as set forth in claim 11 in which a liquid devoid of propping agent is inserted between the carrying liquid and the wiper plug.

References Cited

UNITED STATES PATENTS

| | | | |
|---|---|---|---|
| 3,033,286 | 5/1962 | Fast et al. | 166—42 X |
| 3,101,115 | 8/1963 | Riordan | 166—42 X |
| 3,106,959 | 10/1963 | Huitt et al. | 166—42 X |
| 3,108,636 | 10/1963 | Peterson | 166—42 |
| 3,200,882 | 8/1965 | Allen | 166—42 |

DAVID H. BROWN, *Primary Examiner.*